Oct. 31, 1939.  W. F. ALDER  2,177,630
ELECTRIC HYGROMETER
Filed Nov. 10, 1936  4 Sheets-Sheet 1
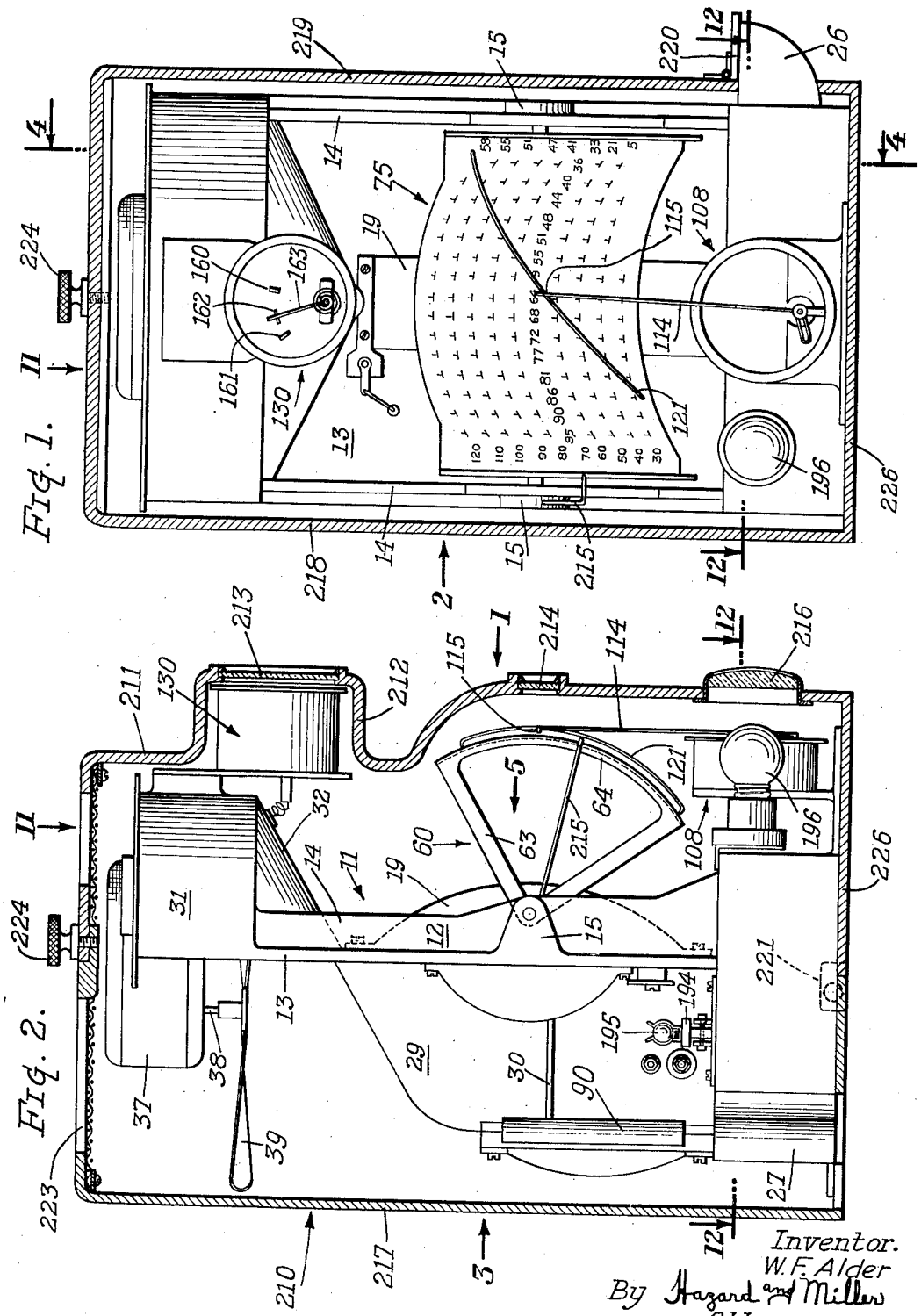
Inventor.
W. F. Alder
By Hazard and Miller
Attorneys.

Inventor.
W. F. Alder
By Hazard and Miller
Attorneys.

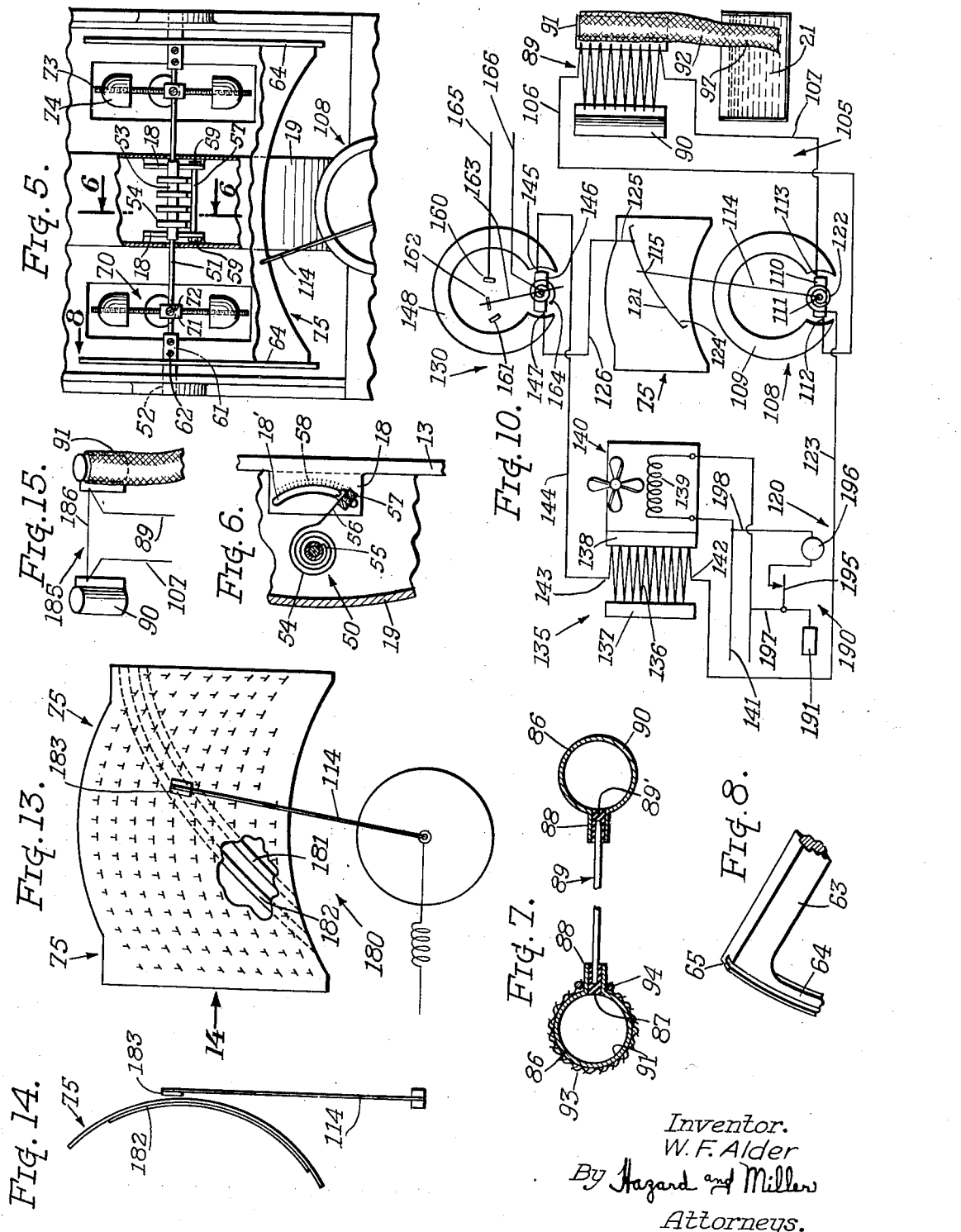

Oct. 31, 1939.  W. F. ALDER  2,177,630
ELECTRIC HYGROMETER
Filed Nov. 10, 1936    4 Sheets-Sheet 4
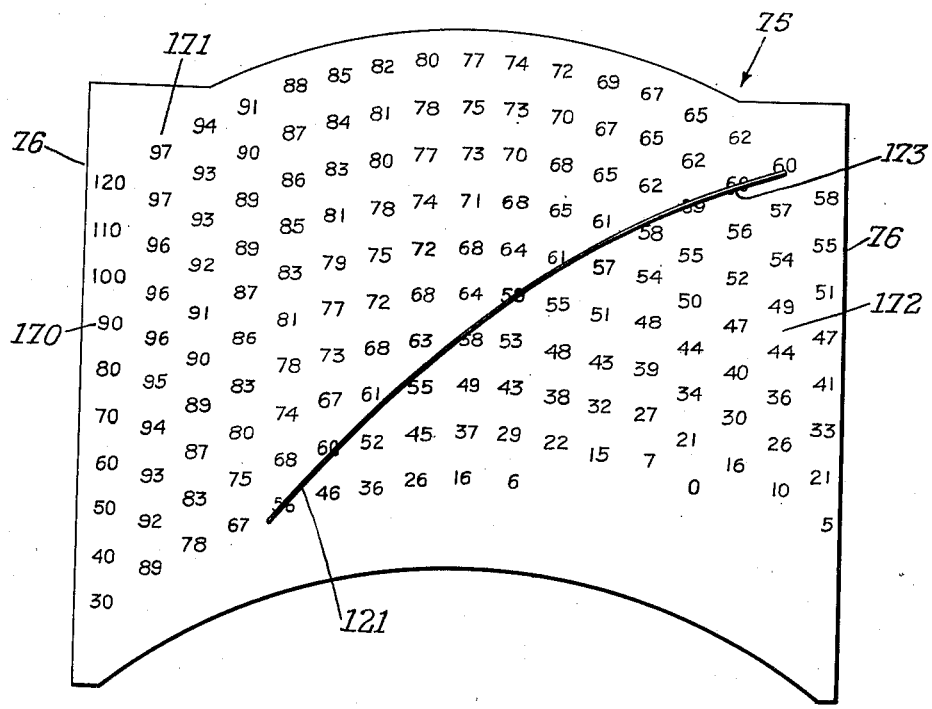
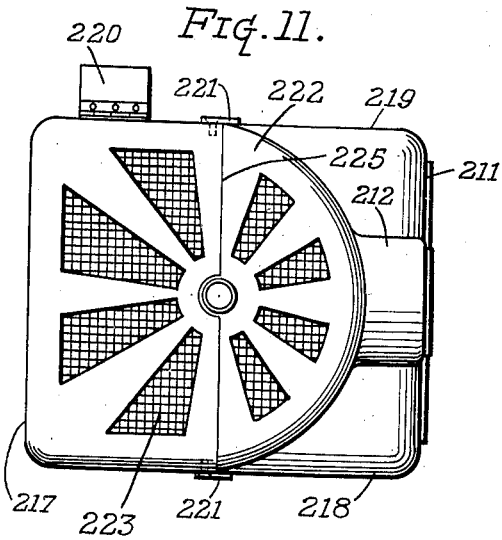
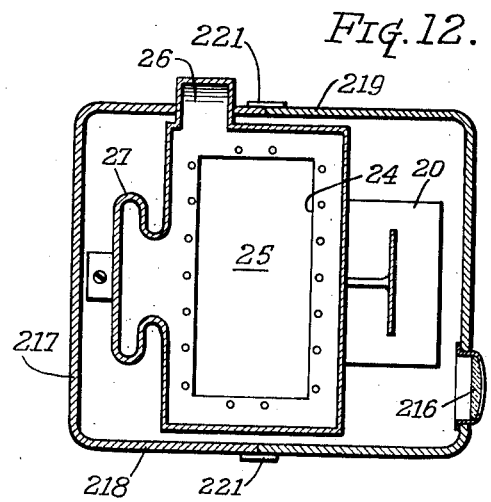
Inventor.
W. F. Alder
By Hazard and Miller
Attorneys.

Patented Oct. 31, 1939

2,177,630

UNITED STATES PATENT OFFICE 2,177,630

ELECTRIC HYGROMETER

William F. Alder, Altadena, Calif., assignor to Frank E. Wood, Monrovia, Calif., as trustee Application November 10, 1936, Serial No. 110,131

12 Claims. (Cl. 73—336)

I designate my invention as an electric hygrometer as I make use of certain electrical phenomena in obtaining hygrometric measurements. The instrument therefore which I have discovered and invented makes use of the electrical phenomena of an electric thermo-couple which records or indicates differential temperatures and coupled with this I employ an integrating device having hygrometric tables so that the relative humidity may be obtained for any temperatures between predetermined range limits. The relative humidity may be indicated or a record may be made thereof or a signal device operated to give a warning or to operate by relays a suitable control for mechanism to be operated when the relative humidity deviates from a predetermined value at the range of temperatures desired.

An object and features of my invention is the construction and development of a compact and unitary instrument which determines the relative humidity of the air or if desired other gases and may be used in conjunction with so-called air conditioning, this feature of air conditioning including providing the proper amount of moisture in the air between specific temperature ranges. As above mentioned the instrument may be used either to indicate or record the changes of humidity values or by suitable relays to control the operation of auxiliary machinery to provide moisure for an air circulating plant.

In view of variable factors entering into a relative humidity, such as the relative humidity being different at low and high temperatures for the same actual amount of moisture in the air, it is necessary to compensate or have the machine integrate for this purpose in accordance with changing temperatures. In my invention I make use of the different temperatures developed by the use of so-called dry and wet bulb thermometers, but as the ordinary thermometers are not sufficiently delicate or accurate, I use a thermo-electric pile for this purpose. Therefore one of the objects and features of my invention is developing a thermo-electric pile to generate thermo-electric current by the medium of two elements subjected to a difference of temperature, one of which is exposed to preferably circulating air and the other exposed to the same air but cooled by the evaporation of water therefrom, such water being preferably drawn from a reservoir by a suitable wick. An indicating instrument is operated by the thermo-electric current and will indicate a potential difference between the two sides of the thermo-pile. A further detailed feature of my invention is forming the thermo-pile in conjunction with two silver tubes which are similar in structure and mounting except that one tube is encased or connected to a wick, this being continually moistened by water from a reservoir. These silver tubes each have a thermo-series adjacent thereto but preferably electrically insulated from the tubes so that a change of temperature of each couple develops its own electric current. These couples are connected together to develop a differential potential between the two sets of junctions or what might be termed between the two sides of the thermopile assembly.

A further object and feature of my invention includes an indicating instrument preferably having a pointer actuated by the thermo-electric current, this being in the form of a micro-ammeter which indicates slight changes of the temperature between the two silver tubes or similar devices.

Another object and feature of my invention involves developing a movement in a hygrometric chart or tables of humidity so that as the temperature changes the table will be moved to position the correct set of humidity numbers to register with the pointer actuated by the thermoelectric pile. A further detail feature of my invention relates to the specific construction of the chart or table involving the humidity numbers being arranged in a series of arcs or curves to form a proper registry with the end of a pointer oscillating on a pivot as regards temperature difference between the air temperature and wet series values.

Another detail feature of my invention thus includes a temperature responsive device in which a partial drum or partial cylinder including a chart is moved in an arc by changes of temperature of the same air to which the wet and dry tubes are subjected. A relatively simple way to accomplish this is to employ thermostatic elements which by their expansion and contraction due to temperature changes, cause a rotation of the cylindrically arranged chart. This may be accomplished by having a series of temperature responsive coils acting on a single instrument for rotating the chart. Thus by having a series of such temperature responsive devices, a compensation is made for inaccuracy in any one of the devices. It is within the scope and spirit of this invention to use a plane chart moved vertically by a suitable series of levers which are actuated by a simple bi-metallic element in lieu of the spiral elements shown.

My invention is illustrated in connection with the accompanying drawings, in which:

Fig. 1 is a front elevation taken in the direction of the arrow 1 of Fig. 2 with the cover casing broken away.

Fig. 2 is a side elevation with the casing in section taken in the direction of the arrow 2 of Fig. 1.

Fig. 5 is a partial elevation taken in the direction of the arrow 5 of Fig. 2 of the thermo-metric operating mechanism for the chart.

Fig. 6 is a detail vertical transverse section on the line 6—6 of Fig. 5 in the direction of the arrows showing one of the thermo-metric coils.

Fig. 7 is a detail horizontal section taken substantially on the line 7—7 of Fig. 3 or 4 of the thermo-electric assembly having the wet and dry tubes with parts omitted to show the connection of the thermocouples.

Fig. 8 is a perspective view taken substantially in the direction of the arrow 8 of Fig. 5 showing a portion of one of the quadrants for mounting the chart.

Fig. 9 is a developed view of the chart.

Fig. 10 is an electrical diagram showing the thermo-electric series with the wet and dry tubes, the pointer actuated by the current developed thereby and the electric relay control by the pointer.

Fig. 11 is a plan of the top of a cover case taken in the direction of the arrow 11 of Fig. 1 or 2.

Fig. 12 is a horizontal section on the line 12—12 of Fig. 1 or 2 taken in the direction of the arrows.

Fig. 13 is an elevation similar to a portion of Fig. 1 showing a capacity or condenser type of circuit between the pointer and condenser strips on the chart, this figure being more or less diagrammatic.

Fig. 14 is an end elevation of Fig. 13 taken in the direction of the arrow, also shown in a diagrammatic manner.

Fig. 15 is a diagram of a thermocouple between the wet and the dry tubes instead of the thermo-pile as illustrated in the diagram of Fig. 10.

Figure 3:
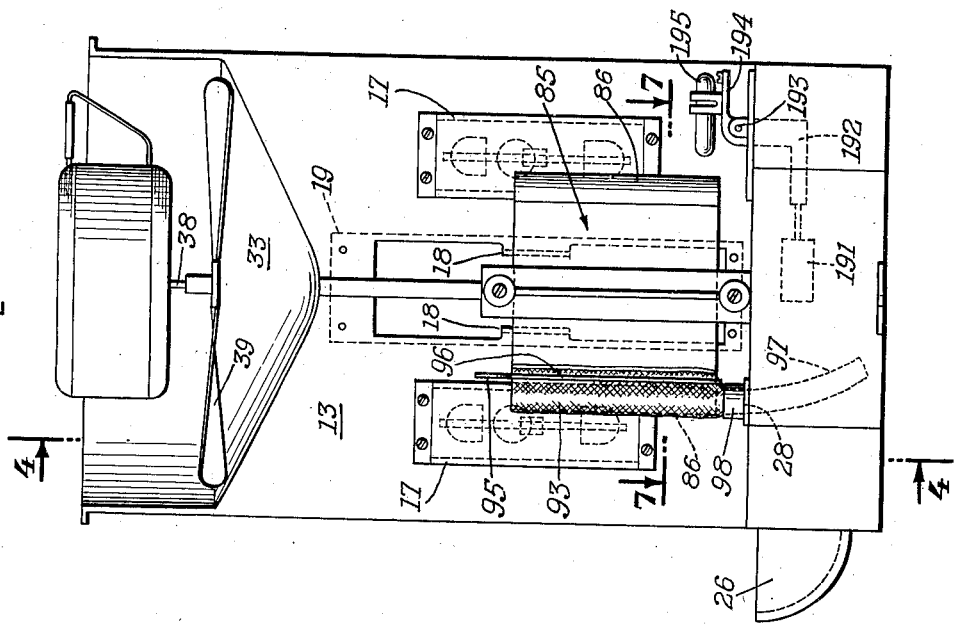
Fig. 3 is a rear elevation taken in the direction of the arrow 3 of Fig. 2.

In my instrument I employ a frame structure 11 (note particularly Figs. 1 to 4) which has a central upright casting 12, this being in the form of a wide vertical partition plate 13, having two marginal webs 14 projecting forwardly, there being also a plurality of journal ears 15 extending forwardly from the outer side edges of the plate and forming a reinforcement of the webs 14. The plate has two central openings 16 with a curved cover panel 17 attached adjacent the margins thereof to prevent a draft of air effecting the electrical parts of the apparatus. This panel 17 is on the rear side of the plate. On the forward side of the plate there are two vertical plates 18 with arcuate slots 18' to which the thermo-metric coils are attached as hereinunder detailed and over this is a cover cap 19 attached to the front of the plate 13 to protect the thermo-metric coils from the air draft.

A flat base 20 forms the support for the frame 11, being preferably formed integral with the central upright casting 12. A water reservoir 21 connects the base and the frame 12. This is defined as having a top 22 and sides 23 with an opening 24 in the bottom closed by a removable clean-out plate 25, this having a water tight joint. At one side of the reservoir there is a filling cup 26 open at the top for supplying water to the reservoir. The reservoir is also provided with a lateral extension 27 having an opening 28 for a wick as hereinunder described, this extension being on the rear side of the partition plate 13. Extending outwardly from this partition plate 13 on the rear side thereof there is a wide fin 29. This connects with the top of the reservoir and has horizontal flanges 30 for reinforcement.

An electric motor support 31 has a sloping plate structure 32 extending laterally from the upper part of the casting 12, preferably formed integral therewith, this extending the full width of the casting 12 forming a relatively large recess 33 on the front side of the partition 13 at the top of the instrument frame. A secondary frame structure 34 includes a bracket 35 with an attaching means 36 for an electric motor housing 37. This housing contains an electric motor with a fan shaft 38 and a fan 39 of the propeller blade type positioned to direct a draft of air downwardly, the sloping plate structure 32 causing the draft of air to be directed downwardly on the rear side of the vertical partition plate 13 for purpose hereinunder detailed.

Figure 4:
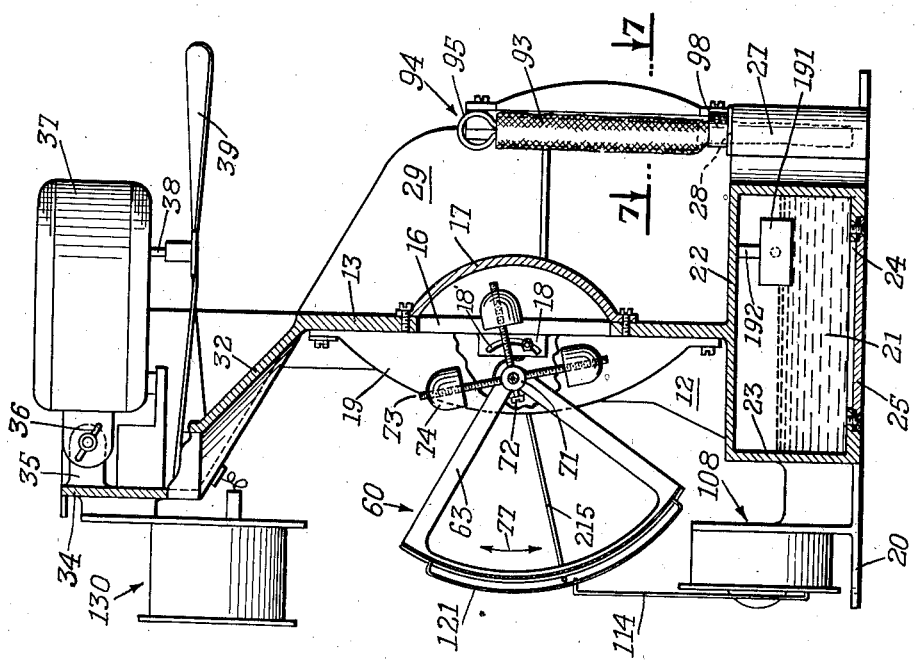
Fig. 4 is a vertical section from front to rear taken substantially on the section line 4—4 of Fig. 1 or 3 in the direction of the arrows.

The thermo-metric operating mechanism designated by the assembly numeral 50 is shown particularly in Figs. 4, 5, and 6. This includes the oscillating shaft 51 which is journalled preferably in bushings such as 52 in the marginal webs 14 and the journal ears 15 or if desired, only in the journal ears. At the center portion of the shaft there is a hub 53 having a series of bi-metallic thermo-metric coils 54 connected thereto. Each coil as indicated at Fig. 6 has its inner end 55 secured to the hub and coiled thereabout in a spiral type coil. The fixed end 56 is attached to a shiftable rod 57 extending through the arcuate slots 18' of the plates 18; and when aligned with graduations 58 is secured with nuts 59, providing a setting for coils 54. A number of these coils are used for the purpose of averaging any air which a single thermo-metric element might interpose. These coils are covered by the cover cap 19 but are subject to the atmospheric temperature of the place in which the instrument is used. Secured to the shaft 51 is a quadrant assembly 60. Each quadrant has a hub 61 clamped to the shaft by set screw 62 or the like and has radially diverging arms 63 connected by a segmental curved quadrant 64. The inner edge of each quadrant has a groove 65 concentric with the shaft (note Fig. 8). A static and dynamic balance is given to the quadrants by a balance arm and weight assembly 70, there being two of these assemblies, each having a hub 71 (note Figs. 4 and 5) secured to the shaft 51 by a set screw 72 or the like and having a series of radial arms 73 which are screw threaded and on which are mounted adjustable weights 74 which weights, when properly adjusted, may be secured by set screws or any other suitable manner. The curved cover panels 17 protect the weights from the down-draft of air caused by the fan. A chart 75 is formed of stiff paper or cardboard such as Bristol board and has its two marginal edges 76 fitted in the grooves 65 of the quadrants. The chart is thus curved and forms a section of a cylinder (note Figs. 1, 2 and 4). On account of the static and dynamic balance above described, the chart and the shaft on which it is mounted may readily turn in an up and down direction indicated by the reversed arrows 77 of Fig. 4 in accordance with the changes of temperature of the air at the place in which the instrument is installed, the coils 54 expanding or contracting with the temperature as is well known in such thermo-metric temperature indicators. It is to be noted that the chart and all of this balanced mechanism of the thermo-metric indicating device is adequately screened from the down-draft of air from the fan and thus is responsive solely to temperature changes in the movement of the chart. The details of the chart are given hereinunder.

The thermo-electric series designated by the assembly numeral 85 includes two silver tubes 86, (note Fig. 7) these each having a longitudinal slot 87 with integral flanges 88 extending towards each other to receive the thermopile 89 (note Fig. 10). This thermopile is formed of alternate strips of iron and constantan wire converging to the opposite tubes and an iron and constantan strip or ribbon being connected together at their point of contact in any suitable manner. I find it satisfactory to have sixty couples with thirty junctions on each side. The junctions are held between the flanges 88 by celluloid 89', this being molded from liquid celluloid which hardens and forms an electrical insulation of the thermopile or couple from the silver tubes but has a good heat transference connection through the celluloid. One of these tubes indicated at 90 has a polished exterior surface without a cover whereas the opposite tube 91 similarly polished, is covered by a wick 92. The wick is formed of a strip of fabric 93 curved around and in close contact with the outside of the tube 91 and held in place by a spring clip 94 (note Figs. 3, 4 and 7). This clip has an eye 95 at the top and two prongs 96 clamping the longitudinal edges of the wick adjacent the flange
88. The wick has a downward extension 97 which passes through a ferrule 98 above the opening 28 of the extension 27 of the reservoir 21 and thus dips into the water in such reservoir. Both of the tubes, that is, the polished tube and the tube having the wick, are exposed to the downward draft of air from the fan. As the tube with the wick is cooled by evaporation of water from the wick, the two tubes function somewhat as a wet and a dry thermometer commonly used in hygrometric tests of air. In this case however, the tubes and the wick are stationary with the air circulating past these. The change in temperature of the tube 91 having the wick thereon cause the development of a thermo-electric current in the grid structure of the thermopile wires or strips.

The resultant current develops a circuit in the wires 105 (note the wiring diagram of Fig. 10), there being a lead 106 from the upper connection of the grid and a lead 107 to the lower connection. These leads connect to an instrument of a micro-ammeter type 108. This is illustrated in the diagram of Fig. 10 as having a field magnet 109 with a rotatable armature coil 110 mounted on pivots 111 situated between the poles of the magnet. The lead 106 connects as indicated at 112 to one end of the coil 110 and the lead 107 connects at 113 to the opposite end of this coil. These leads have a flexible section to permit free rotation of the armature coil. A pointer arm 114 is connected to the armature to move therewith and has an electric contact end 115 to close an electric relay circuit hereinunder described.

In the relay circuit designated by the assembly numeral 120 I use a contact wire 121 connected to the chart and extending thereacross in a diagonal manner from the upper to the lower edge, this wire however being spaced from the chart in order to be engaged by the contact end 115 of the pointer. This pointer is electrically connected to a hair-spring conducting wire 122 from which extends an electric lead 123. One end, preferably the lower end of the chart wire 121 indicated at 124, is insulated but the opposite end, that is, the upper 125 is connected by an electric lead 126 to an electro-magnetic relay 130 (note Fig. 10).

A current supply device designated 135 (note Fig. 10) is used to generate or supply current for the relay 130. This may be any suitable type device for supplying a low amperage current. In the construction shown I illustrate a grid 136 forming a thermo-electric pile. This may be constructed by using two tubes or U shaped metal plates 137 and 138 with the wires forming the thermopile formed of alternate strips of iron and constantan metal arranged somewhat as the thermopile 89, the wires being connected much as shown in Fig. 7. In this case however, the tube or connecting strips 138 are positioned to be heated by the field winding 139 of the fan motor 140 mounted in the motor housing 37. The field is energized by a circuit 141 which may connect to an alternating current line. In the illustration shown the electric lead 123 connected to the pivoted end of the pointer 114 connects at 142 to the thermopile grid 136. The opposite end 143 of this grid has a lead 144 which connects at 145 to the armature winding 146 of the relay 130. The lead 126 from the contact wire 121 connects at 147 to the opposite end of this armature coil. The relay is indicated as having a field magnet 148.

The relay 130 may be bi-polar by having two fixed or adjustable contacts 160 and 161 to be engaged by a moving contact 162 on the movable pointer arm 163 secured to the pivoted coil 146, this coil being mounted in the usual manner on pivots. A spring 164 retains the pointer in its neutral position. In the illustration a lead 165 connects from one of the contacts 160 and a second lead 166 from the pivotal point of the pointer 163. These lead to an external circuit not illustrated, for either giving a signal or operating a relay for controlling certain mechanism, which for instance may be connected to an air conditioning plant.

The operation of the device as so far described is substantially as follows: In accordance with temperature changes in a room or place in which the instrument is installed, due to the action of the thermo-metric coils 54, the chart is moved up or down in the direction of the reversed arrow 77 of Fig. 4. This alters the point of contact of the diagonal wire 121 mounted on the chart with the contact point 115 of the pointer arm 114 of the micro-ammeter device 108. As above mentioned, this pointer is moved due to the electric current developed by the thermopile 89 which is influenced by the wet and dry silver tubes 90 and 91. The power source 135 having in this instance thermo-electric couples, supplies the direct current passing between the pointer arm 114 and the contact point 115 of the pointer arm 114 and the contact wire 121 mounted on the chart. On this contact being made the armature coil 146 of the relay 130 is energized and causes a movement of the pointer arm 163 of the relay thus bringing the contact 162 into engagement with one or other of the contacts 160 or 161 and hence establishing an external circuit which may be used for signalling or machinery control mechanism.

The chart 75 is illustrated developed, that is in the flat, in Fig. 9. The characteristics of this chart are that it has the two marginal edges 76 which fit in the grooves 65 of the quadrants. This causes the whole chart to have a cylindrical curve. Adjacent the left hand edge of the chart there is a vertical temperature column 170, this being indicated in from 30 to 120 degrees F., that is, jumps of 10 degrees and the chart is constructed from United States Government hygrometric charts. However instead of the relative humidities for each temperature being arranged in a horizontal row there are a series of curved or arched lines 171. These are all on the same curvature, that is, have the same radius, such radius being defined as the length of the pointer 114 so that the contact end 115 of this pointer for any particular temperature will follow one of these arched lines. The relative humidity tables also have a series of vertical columns 172. The contact wire 121 is illustrated as being stretched across the chart in a line approximating a relative humidity of 60. It will be noted that it is necessary to interpolate between adjacent humidity figures of the various curved lines. The reference point of each numeral is indicated by a dot 173 below each humidity numeral. Such wire is secured to the chart in any suitable manner, being spaced slightly above the chart and has a lower end support 124 and the upper lead connection 125, this latter being shown as connected to the electric lead 126 (note Fig. 10). Manifestly if it is desired to make the electric contact between the pointer end 115 and the chart wire 121 at different humidities, the wire will be arranged in a different manner on the chart. It is therefore preferable in a laboratory to attach wires such as 121 to a series of different charts to have a position corresponding to different humidities. It is also manifest that if the pointer end 115 is to operate between minimum and maximum humidities, that it will be necessary to have two wires such as 121, one of which would follow the low humidity figures and the other the high humidity figures. In this case the moving contact 162 of the relay 130 would make a contact with the adjustable contact 161 as well as the contact 160 depending on whether the humidity were low or high and it would be necessary to run a lead wire corresponding to 165 from the contact 161 and making a connection in an external circuit corresponding to 165 and 166.

In Figs. 13 and 14 I show a condenser or capacity assembly designated 180 which is alternative to using a contact wire such as 121. In this case I employ one or two condenser strips 181 and 182 which may be made of silver or aluminum foil about .001 inch in thickness. These are secured to the underside of the chart 75 with the average desired humidity curve midway between the two strips. The pointer 114 has a condenser plate 183 which may be of silver or aluminum foil and is thus positioned above the paper or card board chart. Suitable electrical connections are made from the ends of the foil strips 181 and 182. A circuit suitable for connection through the pointer and to the ends of the strips is a standard grid glow tube circuit in which a grid glow tube acts as a relay and in which the capacity change disturbs the voltage and fires the tube. It will be obvious that by a suitable amplification the current through the tube may be amplified in standard and known manners.

In Fig. 15 I show a thermocouple 185 instead of the thermopile 89 of Fig. 10. In this I use the polished silver tube 90 and a similar tube with a wick 91. The thermocouple may consist for instance of a constantan wire 186 forming a thermal connection to the two tubes much as shown in Fig. 7 and the leads 89 and 187 may be formed of iron wire to develop the two ends of the thermocouple.

As it is convenient to have a signal to show the water level in the reservoir 21, I employ a water signal mechanism designated by the assembly numeral 190 (note particularly the diagram of Fig. 10). This includes a float 191 attached to a pivoted arm 192 (note Figs. 3 and 4). This arm is indicated as pivoted at 193 to a fixed structure preferably the top of the reservoir, there being an opening for the passage of the arm. The upper end of the arm has a switch supporting portion 194 on which I mount preferably a mercury switch 195. An electric lamp 196 is connected in the circuit of the switch. The signal circuit is indicated in Fig. 10 as having one lead 197 and a second lead 198, these being hooked to the opposite sides of the supply current line 141. The float and switch are arranged so that when the water level drops to a predetermined point due to the evaporation from the wick 92, the lamp signal is given, thus indicating that the reservoir should be replenished.

In the above description of my invention I have not designated in detail a construction for covering or protecting the operative parts of the instrument. However, it is desirable to provide a cover or case designated by the assembly numeral 210. This may be considered as having a front wall 211 with a projecting portion 212 for the electro-magnetic relay 130. A glass window 213 allows inspection of the position of the pointer 163 of this relay. A second and arch shaped window 214 is positioned in front of the chart so that the position of the pointer end of the pointer arm 114 in relation to the chart may readily be inspected. This also allows observation of a fixed temperature indicator 215 (note Fig. 1) and attached to a fixed part of the instrument and pointing to the temperature column 170 of the chart 175. A third or lower window 216 is located in front of the signal lamp 196. The back 217 of the case covers the rear portion of the instrument assembly forming a cover for the assembly 85 of the thermo-electric series. The side walls 218 and 219 form suitable covers for the side of the instrument, the filling cup 20 projecting through an opening in one side and having a cover lid 220. The front and back portions of the cover are preferably made with a vertical joint 221 for removal from the frame of the instrument. The top 222 is provided with a series of screened openings 223 and is provided with a threaded knob 224 which may function to attach the front and rear portions of the frame together at the top joint 225. The base 226 of the cover is provided with a series of opening and the instrument may be suspended on a wall or the like. It will therefore be apparent that the electric fan 39 develops a downward flow of air which is confined to the rear portion of the instrument back of the casting 12. This subjects the two silver tubes 90 and 91 to the downflow of air and thus the wick 92 has continuous air flow thereover to facilitate the evaporation of the water from the wick. The quadrant assembly 60 having the chart and the thermo-metric coils 54 are maintained in still air. However, there is sufficient space forming a non-draft communication between the front portion on the instrument and the back portion so that the air surrounding the thermometric coils 54 is of the same temperature as the air flowing over the wick and the dry tube 90.

By the construction above described it will be noted that my invention comprises two main devices in which one may be considered as the humidity responsive assembly in which the thermo-electric current operates the electro-magnetic instrument having the pointer. The second includes the temperature responsive assembly having the chart moved by thermo-metric devices. It is believed obvious that the chart and pointer might be interchanged, that is, that the humidity responsive assembly developing the thermo-electric current could be used to move the chart and thermo-metric coils or the equivalent utilized to move the pointer, the chart and pointer being arranged contiguous for integrating the humidity values for different temperatures. It will also be apparent that the pointer and the chart operate as indicating instruments showing the relative humidities for different temperatures but it is also apparent that the chart could be omitted and a device prepared having either a conducting wire as shown in Fig. 4 or the combination of conducting and capacity elements as shown in Figs. 13 and 14, for when the instrument is used for giving a signal or operating a relay, the chart itself is not essential for direct application to the instrument.

It is believed that a simplification of my device is quite obvious in that the movable pointer 114 of the humidity responsive device may be considered by its movement of giving an indication of the temperature differentials of a wet and dry thermometer used for determining hygrometric values. This pointer may be moved over a chart having a hygrometric table with temperature numerals thereon and numerals for the various humidities, then this chart may be manually shifted in accordance with the particular air temperature at the time in which the pointer is being influenced by the differential temperatures of the dry tube 90 and the wet tube 91 having the wick 92 or the equivalent.

Various changes may be made in the details of the construction without departing from the spirit or scope of the invention as defined by the appended claims.

I claim:

1. In a device as described, the combination of a first instrument assembly having a wet and a dry element with means forming a thermo-electric couple therebetween in accordance with the air humidity, an electro-mechanical device operated by the thermocouple current, a second instrument assembly including a movable chart having a table of humidities for different temperatures, a thermo-metric means to move said chart, the chart and an indicating portion of the electro-mechanical device being relatively positioned to designate the particular humidity for a predetermined series of temperatures, a signalling assembly having one part including the indicating portion of the thermo-electric device and another part operatively connected to the chart arranged to give a signal at substantially the same degree of humidity for different temperatures.

2. In a device as described, the combination of a humidity influenced assembly including similar structural elements, a wick forming a covering for one of the elements, means to maintain the wick moist with water, means to subject both elements with the wick to circulating air, means to produce a thermo-electric current due to the differential temperatures of the said elements, an electro-mechanical indicator operated by such thermo-electric current, a temperature responsive assembly including a movable chart having a hygrometric table thereon, such table having numerals for different temperatures and other numerals for humidities at each temperature, means to move the chart in accordance with changes of temperature of the air influencing the said elements of the humidity influenced assembly, the said chart and the electro-mechanical indicator being positioned whereby said indicator registers on the chart with the correct humidity numeral for the specific air temperature, one or more electric conductors arranged contiguous to the chart and conforming in position to substantially constant humidity values, a source of a secondary current, means to close the secondary circuit through part of the electro-mechanical indicator and one of the conductors to produce the secondary circuit at substantially constant humidity values but over different temperature ranges.

3. In a device as described, the combination of a humidity influenced assembly including a pair of similar structural elements, a wick covering one of the said elements, means to maintain the wick moist with water, means to subject both elements to circulating air, thermopile wires thermally but not electrically connected to the said elements to be influenced by the difference of temperature between the element having the wick and the element without the wick to produce a thermo-electric current, an electro-mechanical indicator having a movable pointer operated by such thermo-electric current, a temperature responsive assembly including a chart having a hygrometric table, a supporting means for the chart curving the chart to form part of a cylinder, a thermo-metric device operatively connected to the chart supporting means to oscillate the chart in accordance with changes of air temperature, the said chart having a table with a column having temperature numerals and a series of arcuate lines having numerals of different humidities associated with the temperature numerals, the pointer having its free end positioned contiguous to the chart to conform in its movement to the curved lines of numerals of the humidities and thereby register with the particular humidity numeral for the particular air temperature.

4. In a device as described and claimed in claim 3, the chart having one or more electrical conductors positioned contiguous thereto, said conductor or conductors being positioned on the chart to conform to the same humidity value for different temperatures, a power source for a second electric circuit, the second circuit having a connection through the pointer and through the conductor to establish the second current through the pointer and one of the conductors when the air has the same humidity value for different temperatures.

5. In a device as described, the combination of a humidity influenced assembly including a pair of similar structural elements with means for evaporating water from one element and maintaining the other element without evaporation to develop a difference of temperature between said elements, means to produce a thermo-electric current due to the differential temperatures of the said elements, an electro-mechanical instrument having a movable element operated by the thermo-electric current, a movable supporting structure having one more electric conductors, a thermo-metric means to move the support and the conductors, the conductors and a pointer part of the movable element of the electro-mechanical device being positioned for registry whereby the conductor or conductors conform to a path of contiguity with the said pointer part of the movable element to define substantially constant humidity values for changes of temperature, an electric power source with a connection through the movable element and the conductor or conductors to produce a closed circuit when the pointer end of the movable element is closely contiguous to one of the conductors.

6. In a device as described and claimed in claim 5, the conductor or conductors being positioned and mounted to rotate in an arc around a first axis, the pointer part of the electro-mechanical device being positioned to be rotatable about a second axis, the two axes being at right angles one to the other.

7. In a device as described, the combination of a supporting structure, a hygrometric chart mounted thereon, said chart having a table with a vertical column of numerals giving different temperatures and a series of arched lines of humidity value numerals, there being an arched series of numerals for each temperature numeral and means to move the supporting structure with the chart whereby different humidity values may be interpreted for varying temperatures.

8. In a device as described and claimed in claim 7, the chart having one or more electrical conductors positioned contiguous thereto, the conductor or conductors being arranged approximate to the same humidity values for different temperatures and means operated by temperature changes to establish an electric circuit through one of the conductors.

9. In a device as described, the combination of a supporting structure, a hygrometric chart mounted thereon forming part of the periphery of a cylinder, said chart having a table with at least one column of numerals arranged peripherally of the chart and giving different temperatures and a second series of numerals arranged in arched lines considered somewhat longitudinally of the chart and designating humidity numerals for each temperature, a pointer arm having a pivot at right angles to the axis of the supporting structure and thus of the cylinder of the chart and having a free end movable over the chart, means to rotate the chart in accordance with changes of air temperature and means to move the pointer in accordance with changes of air humidity whereby the free end of the pointer may register with the arched lines of humidity numerals and thus indicate the humidity at a specific temperature, the chart having an elongated electrical conductor forming a line relative to the cylindrical periphery of the chart and also conforming to the same relative humidity for different temperature values, the free end of the pointer having a contact to engage the said conductor and thus form a closed contact for an electric circuit through the conductor and the contact.

10. In a device as described, the combination of a movable supporting structure having an elongated electrical conductor positioned thereon and having a shape to define substantially the same relative humidities for varying temperatures, means to move said structure and thus the conductor in accordance with changes of air temperature, an electrical contact, means to bodily move said contact in accordance with changes of air humidity whereby the contact and the conductor may engage and thus complete a connection for an electric circuit through the conductor and the contact.

11. In a device as described the combination of a first circuit forming means to develop a first changing electric current in accordance with the humidity of the air, a first circuit closing means operated by the first electric current, a second and complementary circuit closing means with a control therefor operated in accordance with the changing temperature of the air, the first and second circuit closing means being positioned to close a circuit at predetermined relationships of temperature and humidity and means to develop a second electric current through the first and second circuit closing means whereby the second current is established at varying humidities and at varying temperatures.

12. In a device as described the combination of an electro-mechanical device having a movable indicator, means to actuate said device by an electric current produced through differential temperatures resulting from evaporation of water and non-evaporation of water from similar structural elements, a chart having a hygrometric table thereon, means to move said chart in accordance with the change of temperature of the air to which said elements are subjected, a mounting means to support the said movable indicator elements and the chart to locate the indicator and chart to indicate different air humidities on the chart for different air temperatures, means forming a second electric circuit having a source of power and a circuit closing means actuated by the relative position of the indicating means and the chart whereby a second electric current is developed at substantially the same degree of air humidity for a series of different air temperatures.

WILLIAM F. ALDER.